H. J. MORRIS.
CLEAN-OUT FITTING FOR DRAIN PIPES.
APPLICATION FILED JUNE 22, 1911.
1,083,024.
Patented Dec. 30, 1913.
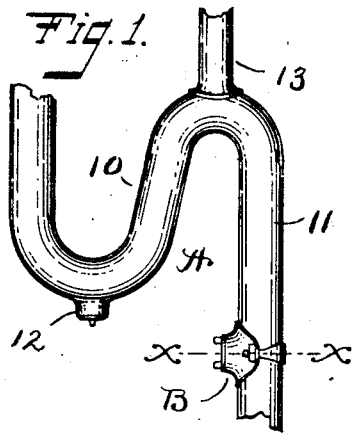
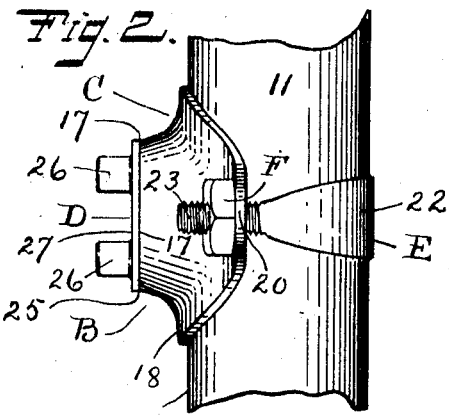
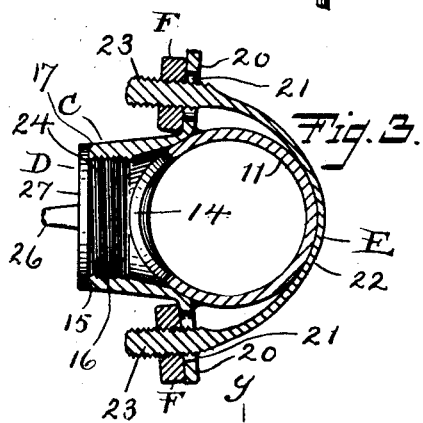
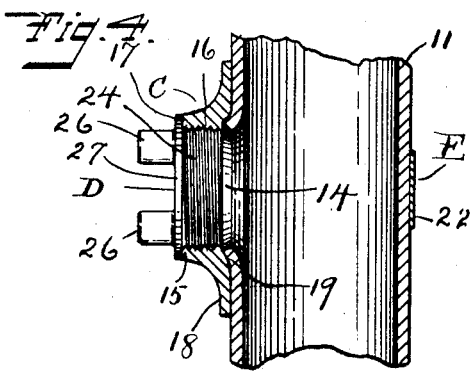
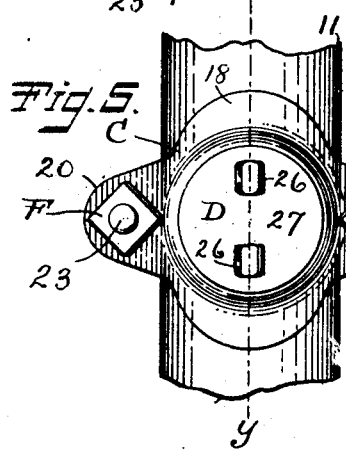
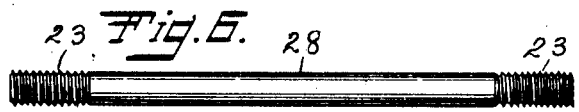
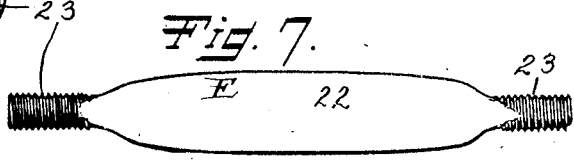
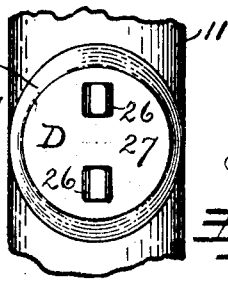
Witnesses:
S. H. Clarke
M. L. Lockwood
Inventor
Hilary J. Morris
By Louis M. Schmidt
Atty.

UNITED STATES PATENT OFFICE.

HILARY J. MORRIS, OF NEW BRITAIN, CONNECTICUT.

CLEAN-OUT FITTING FOR DRAIN-PIPES.

1,083,024.  Specification of Letters Patent.  Patented Dec. 30, 1913.

Application filed June 22, 1911. Serial No. 634,677.

*To all whom it may concern:*

Be it known that I, HILARY J. MORRIS, a citizen of the United States, residing at New Britain, in the county of Hartford and State of Connecticut, have invented certain new and useful Improvements in Clean-Out Fittings for Drain-Pipes, of which the following is a specification.

My invention relates to improvements in clean-out fittings for drain pipes, and the objects of my improvements are to produce a fitting that can readily be applied to the outside of a drain pipe, and without requiring the services of an expert, and that will be serviceable and sanitary in use.

In the accompanying drawing: Figure 1 is a side elevation of a trap and drain pipe equipped with my improved clean-out fitting. Fig. 2 is a similar view of the clean-out fitting and part of the drain pipe shown in Fig. 1, on an enlarged scale. Fig. 3 is a sectional view on the line $x$ $x$ of Fig. 1. Fig. 4 is a sectional view on the line $y$ $y$ of Fig. 5. Fig. 5 is a front view of the same. Fig. 6 is a plan view of the strap member before flattening of the body portion. Fig. 7 is a similar view of the same after flattening of the body portion. Fig. 8 is a view similar to Fig. 5 of a modification of the fitting.

A is a trap and drain pipe of the type in common use for outlets for sinks and stationary tubs, and is made of lead pipe of suitable diameter, and, extending downward from the trap proper 10 to the sewer connection, comprises a downwardly directed outlet pipe 11, and it is to this outlet pipe that my clean-out fitting B is applied for the purpose of permitting ready access to the interior thereof to clean the same out in case of stoppage of the outlet. The said trap proper 10 is provided with the usual clean-out 12 and vent pipe 13, and my clean-out fitting B is applied to the said outlet pipe 11 at a point that is beyond the reach of a wire or other cleaning out means that may be inserted from the regular trap clean-out 12. The said clean-out B comprises a body member C having means for being secured to the outside of the drain or outlet pipe 11 over and surrounding a hole 14 therein, and is provided with a cover D. The said body member C comprises a ring top 15 having a threaded interior 16 and seat 17 on the outer end and integral therewith is provided with a laterally flanged portion or saddle 18 that is a fit for the exterior 19 of the pipe 11 around the hole 14 and is provided as shown with a pair of laterally extending wings 20 having each a hole 21 suitable for receiving the screw-threaded end of the said securing means to be described. The said securing means comprises a clamping strap E, flattened along the strap body portion 22, and bent U shaped, and provided with screw-threaded ends 23, which latter are suitable for being received in the said wing holes 21 as mentioned, and with the U shaped body 22 passing around the back of the pipe 11. Clamping nuts F screwed on the said ends 23 and bearing against the said wings 20 serve to clamp the said strap body E against the pipe 11 and secure the same in position thereon. The said cover D comprises a head 27 having a screw-threaded body portion 24 that is an operative fit for the screw-threaded interior 16 of the ring top 15 and has a seat 25 for coöperation with the said seat 17, and is provided with means for being turned, shown as a pair of studs 26 projecting outwardly from the said head 27. The said clamping strap E I prefer to form from a piece of round wire 28 by flattening the body portion 22 between the ends 23, which latter may be threaded either before or after such flattening, as desired. My clamping strap, made as described, on account of the flattening described of the strap body 22, provides a relatively wide bearing against the side of the pipe 11 and is on this account well suited for use with lead pipe. The saddle portion 18 of the body member C is provided with a relatively wide bearing surface for being seated against the pipe 11 when used with lead pipe, and putty may be used to seal the joint.

My fitting as described is particularly adapted for use with drain or outlet pipes which involve at most only a slight internal pressure and also permits of seating on the outside of the drain pipe of lead as mentioned in such a way as to seat the ring top 15 close to the pipe exterior in its position around the hole 14, which conditions facilitate the insertion of a wire from outside into the body of the pipe for cleaning purposes and to remove a stoppage. It will be noted that the lower end of the opening in the ring top or neck 15 is relatively large and the same is flared outwardly suitably to receive the lateral walls of the hole in the pipe and that the neck itself terminate close to the pipe. These features facilitate the entry of the clean-out wire and feeding the same along the pipe. Accordingly, as described, my fitting B is suitable for being secured to the side of a pipe by clamping means that are easily operated, so that the services of an expert are not required in order to apply the same to a pipe, a feature that may be of advantage in case of emergency.

In the modification shown in Fig. 8, of the body member C¹ the clamping wings are omitted, and the same is secured to the outside of the pipe by soldering, and the same is more easily applied to the pipe than a fitting that enters the hole, and is secured sufficiently rigid for conditions that are found to exist as applied to drain pipes for such as mentioned.

I claim as my invention:—

A clean-out, the said clean-out suitable for use with a drain pipe of lead and in which there is only slight internal pressure, having means for being seated on the outer surface of the said drain pipe and means for being secured thereto, and comprising a neck, and a closure therefor, the said neck being relatively large in diameter, and having a correspondingly large axial opening, the lower end of the said neck being flared to receive longitudinally opposite out-turned portions of the pipe body.

HILARY J. MORRIS.

Witnesses:
NEWTON L. LOCKWOOD,
SHEFFIELD H. CLARKE.